US009471675B2

(12) United States Patent
Galleguillos et al.

(10) Patent No.: US 9,471,675 B2
(45) Date of Patent: Oct. 18, 2016

(54) AUTOMATIC FACE DISCOVERY AND RECOGNITION FOR VIDEO CONTENT ANALYSIS

(71) Applicant: Conversant LLC, Chicago, IL (US)

(72) Inventors: Carolina Galleguillos, San Diego, CA (US); Hardik Jayant Shah, San Francisco, CA (US); Arun Balagopalan, Kerala (IN)

(73) Assignee: Conversant LLC, Chicago, IL (US)

( * ) Notice: Subject to any disclaimer, the term of this patent is extended or adjusted under 35 U.S.C. 154(b) by 0 days.

(21) Appl. No.: 14/308,181

(22) Filed: Jun. 18, 2014

(65) Prior Publication Data

US 2014/0375886 A1    Dec. 25, 2014

Related U.S. Application Data

(60) Provisional application No. 61/836,872, filed on Jun. 19, 2013.

(51) Int. Cl.
| | | |
|---|---|---|
| *G06F 17/30* | (2006.01) | |
| *H04N 5/14* | (2006.01) | |
| *G06K 9/00* | (2006.01) | |

(52) U.S. Cl.
CPC ..... *G06F 17/30793* (2013.01); *G06K 9/00295* (2013.01); *G06K 9/00751* (2013.01)

(58) Field of Classification Search
CPC .................... G06F 17/30793; G06K 9/00295; G06K 9/00751
USPC ............ 348/77, 91, 571; 382/115, 118, 224, 382/225, 278; 725/11, 10, 19, 22
See application file for complete search history.

(56) References Cited

U.S. PATENT DOCUMENTS

| | | | | |
|---|---|---|---|---|
| 2011/0251896 | A1* | 10/2011 | Impollonia | G06Q 30/02 705/14.55 |
| 2013/0263181 | A1 | 10/2013 | Impollonia et al. | |
| 2015/0067600 | A1* | 3/2015 | Steinberg | G06K 9/00208 715/822 |

OTHER PUBLICATIONS

Paul Viola and Michael Jones, "Rapid object detection using a boosted cascade of simple features," Computer Vision and Pattern Recognition (2001).
Mark Everingham, Josef Sivic and Andrew Zisserman, "Hello! My name is . . . Buffy"—Automatic Naming of Characters in TV Video, Proceedings of the 17th British Machine Vision Conference (2006).
Pedro F. Felzenszwalb, Daniel P. Huttenlocher, "Pictorial Structures for Object Recognition," International Journal of computer Vision (Jan. 2005).

(Continued)

*Primary Examiner* — Paulos M Natnael
*Assistant Examiner* — Jean W Desir
(74) *Attorney, Agent, or Firm* — Blank Rome, LLP (57) ABSTRACT

Systems and methods are provided for automatically classifying videos based on faces discovered in the videos, wherein the discovered faces are not known to be associated with a particular category of videos. The detected face is compared to a set of unknown faces to generate a cluster of unknown faces that each match with the detected face. A set of categorized videos is identified based on the cluster of unknown faces. One or more categories are assigned to the video based on categories from the set of categorized videos so that the video can be automatically classified based on the detected face even though the detected face is not associated with a known person.

15 Claims, 9 Drawing Sheets

(56) References Cited

OTHER PUBLICATIONS

Xiaogang Wang and Xiaoou Tang, "Unified Subspace Analysis for Face Recognition," Proceedings of the Ninth IEEE International Conference Computer Vision (2003).
Tianhao Zhang et al., "Discriminative Locality Alignment," Proceedings of the 10th European Conference on Computer Vision: Part I, Oct. 12-18, 2008, Marseille, France.
Mayur Datar et al., "Locality-sensitive hashing scheme based on p-stable distributions," Proceedings of the twentieth annual symposium on Computational geometry, Jun. 8-11, 2004, Brooklyn, New York, USA.
Loïc Paulevéa et al., "Locality sensitive hashing: A comparison of hash function types and querying mechanisms," Pattern Recognition Letters vol. 31, Issue 11, Aug. 1, 2010, pp. 1348-1358.
Wikipedia Hierarchical Clustering article (available at http://en.wikipedia.org/wiki/Hierarchical_clustering).
U.S. Appl. No. 13/793,384, entitled "Systems and Methods for Defining Video Advertising Channels" and filed Mar. 11, 2013—published as 20130263181.
PCT Search Report, Oct. 29, 2014, Set Media, Inc.

\* cited by examiner

AUTOMATIC FACE DISCOVERY AND RECOGNITION FOR VIDEO CONTENT ANALYSIS

CROSS-REFERENCE TO RELATED APPLICATIONS

This application claims priority under 35 U.S.C. 119(e) to U.S. Provisional Application No. 61/836,872, entitled "Automatic Face Discovery and Recognition for Video Content Analysis," filed Jun. 19, 2013, the contents of which are incorporated by reference herein in their entirety.

TECHNICAL FIELD

The technical field relates generally to computer-based methods and apparatuses, including computer program products, for automatic face discovery and recognition for video content analysis.

BACKGROUND

It can be desirable to connect brand advertisers with their audiences through high quality, targeted, and brand safe campaigns at scale. For example, online videos can be classified using object, facial, and motion detection, which can enable advertisers to run ads on relevant content to their brand.

One of the biggest indicators of content type is often to discover specific people in videos. For example, finding personalities such as Barack Obama or Bill Clinton (or other political figures) is a strong indicator that a video is about politics. On the other hand, when finding people such as Dwyane Wade or Kobe Bryant (or other basketball players) there is a high chance that the video is related to basketball.

Although celebrities and high profile people are often easy to relate to specific video content, they appear only in a small fraction of the videos that are currently available in the Web. Therefore, it is difficult to determine the content type of most videos using the people in the videos because they usually include non-celebrity figures.

SUMMARY

The techniques described herein can be used to expand face recognition systems beyond celebrities to include people that appear in a high number of videos in the video inventory of the system.

For example, if a particular astrologist appears regularly in horoscope videos or a particular journalist often appears reporting for news videos, the techniques described herein can include those people in the face recognition system to take advantage of this information.

Therefore, it is beneficial to understand which faces constantly appear for certain categories in the system inventory, identify these people, include this information in the face recognition model and assign those categories to videos where their face is recognized.

The systems and methods described herein can be configured to discover prominent faces from a (huge) database of unknown faces obtained from the video inventory. The systems and methods described herein can also be configured to recognize people in videos. If the system can't identify the faces, the system can include them in a database of unknown people. The systems and methods described herein can be configured to use the unknown face database to identify new people and include them in a face recognition model. The systems and methods described herein can also be configured to obtain information about the type of videos in which these faces commonly appear and use it to improve video classification.

The disclosed subject matter includes a computerized method for automatically classifying videos based on faces discovered in the videos, wherein the discovered faces are not known to be associated with a particular category of videos. The method includes receiving, by a computing device, a video for classification. The method includes detecting, by the computing device, a face of a person in the video. The method includes determining, by the computing device, that the detected face is not associated with a set of known people stored in a known person database that is in communication with the computing device, wherein each known person from the set of known people is associated with one or more categories that can be used to classify videos in which the known person appears. The method includes comparing, by the computing device, the detected face to a set of unknown faces in an unknown face database in communication with the computing device, to generate a cluster of unknown faces that each match with the detected face by meeting a predetermined match threshold. The method includes identifying, by the computing device, a set of categorized videos based on the cluster of unknown faces. The method includes assigning, by the computing device, one or more categories to the video based on categories from the set of categorized videos so that the video can be automatically classified based on the detected face even though the detected face is not associated with a known person.

The disclosed subject matter further includes a server for automatically classifying videos based on faces discovered in the videos, wherein the discovered faces are not known to be associated with a particular category of videos. The server includes a database. The server includes a processor in communication with the database, and configured to run a module stored in memory that is configured to cause the processor to receive a video for classification and detect a face of a person in the video. The module stored in memory is configured to cause the processor to determine that the detected face is not associated with a set of known people stored in a known person database that is in communication with the computing device, wherein each known person from the set of known people is associated with one or more categories that can be used to classify videos in which the known person appears. The module stored in memory is configured to cause the processor to compare the detected face to a set of unknown faces in an unknown face database in communication with the computing device, to generate a cluster of unknown faces that each match with the detected face by meeting a predetermined match threshold. The module stored in memory is configured to cause the processor to identify a set of categorized videos based on the cluster of unknown faces. The module stored in memory is configured to cause the processor to assign one or more categories to the video based on categories from the set of categorized videos so that the video can be automatically classified based on the detected face even though the detected face is not associated with a known person.

The disclosed subject matter further includes a non-transitory computer readable medium having executable instructions operable to cause an apparatus to receive a video for classification and detect a face of a person in the video. The executable instructions are operable to cause an apparatus to determine that the detected face is not associated with a set of known people stored in a known person database that is in communication with the computing device, wherein each known person from the set of known people is associated with one or more categories that can be used to classify videos in which the known person appears. The executable instructions are operable to cause an apparatus to compare the detected face to a set of unknown faces in an unknown face database in communication with the computing device, to generate a cluster of unknown faces that each match with the detected face by meeting a predetermined match threshold. The executable instructions are operable to cause an apparatus to identify a set of categorized videos based on the cluster of unknown faces. The executable instructions are operable to cause an apparatus to assign one or more categories to the video based on categories from the set of categorized videos so that the video can be automatically classified based on the detected face even though the detected face is not associated with a known person.

These and other capabilities of the disclosed subject matter will be more fully understood after a review of the following figures and detailed description. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

System Description

Figure 1A:
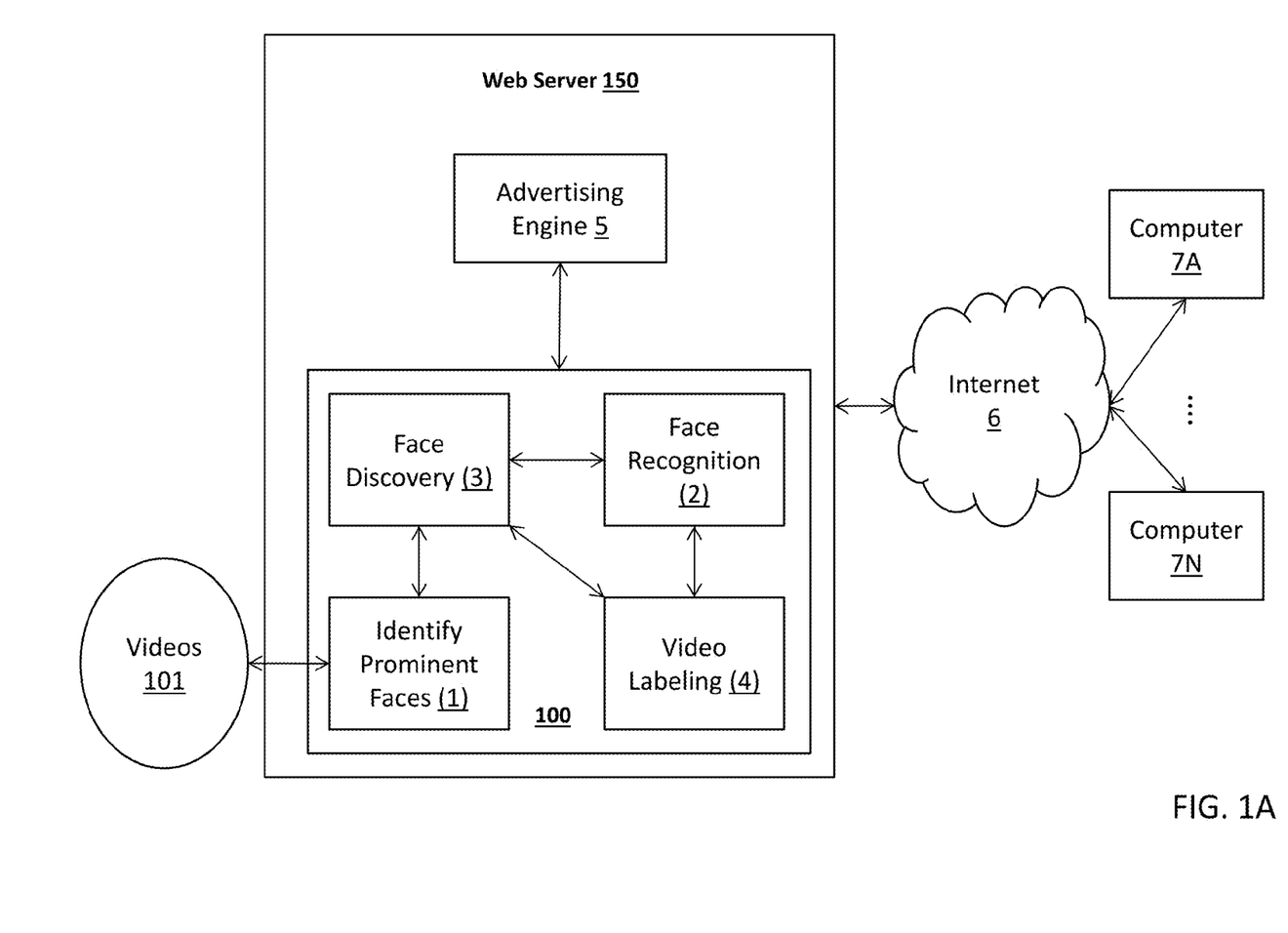
FIGS. 1A and 1B illustrate an exemplary system for face discovery and recognition, in accordance with some embodiments.
Figure 1B:
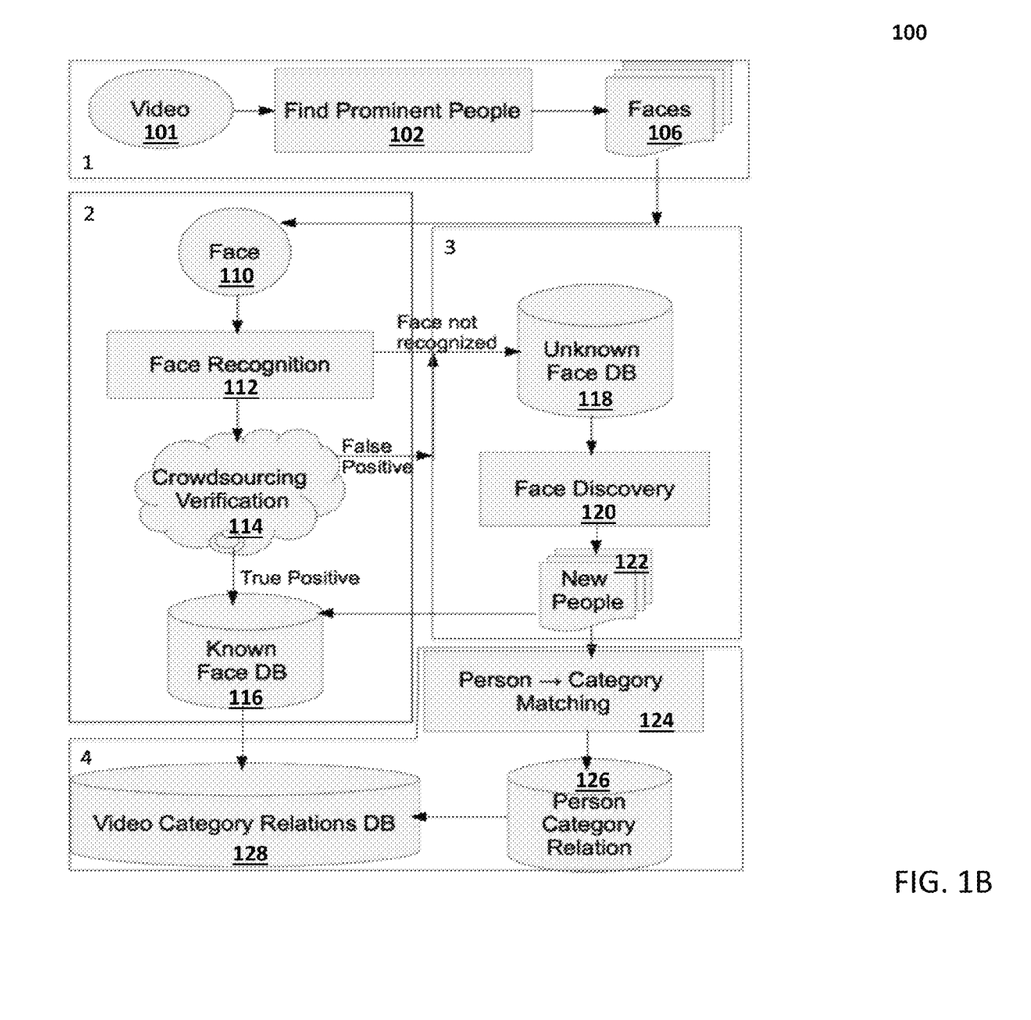

FIGS. 1A and 1B show an exemplary system 100 for face discovery and recognition, in accordance with some embodiments. Referring to FIG. 1A, the framework for system 100 can be divided in four different components: component 1 for finding prominent faces in a video; component 2 for face recognition in videos; component 3 for discovering faces in a large video inventory; and component 4 for video labeling. The system 100 can be implemented as part of and/or as a separate device that communicates with a web server 150. The web server 150 includes an advertising engine 5 that uses the labeled video information generated by system 100 to place advertisements for distribution to computers 7A through 7N via the internet 6.

Referring to component 1 in FIG. 1B, the system 100 receives a video 101 and finds prominent people in the videos at block 102 to generate faces 106. Component 1 is described in further detail in conjunction with FIGS. 2-4.

Referring to component 2, the system performs face recognition in block 112 on face data 110. The system also receives crowdsourcing verification data 114 to verify the face recognition from block 112. If the face recognition is verified, the data is stored in the known face database 116. Component 2 is described in further detail in conjunction with FIGS. 5-6.

Referring to component 3, if the face recognition block 112 does not recognize a face 110 and/or the crowdsourcing verification determines that the face recognition at block 112 resulted in a false positive, then the face 110 is added to the unknown face database 118. The system 100 performs face discovery on the faces in the unknown face database 118 at block 120 to generate new people 122. The system 100 stores the new people 122 in the known face database 116. Component 3 is described in further detail in conjunction with FIGS. 7A-7B.

Referring to component 4, the system 100 performs category matching on new people 122 at block 124. The system 100 stores the category relations in the person category relation database 126, which are used to tag videos to generate video category relations that are stored in video category relations database 128. Component 4 is described in further detail in conjunction with FIG. 8.

Discovering Prominent Faces in a Video

Figure 2:
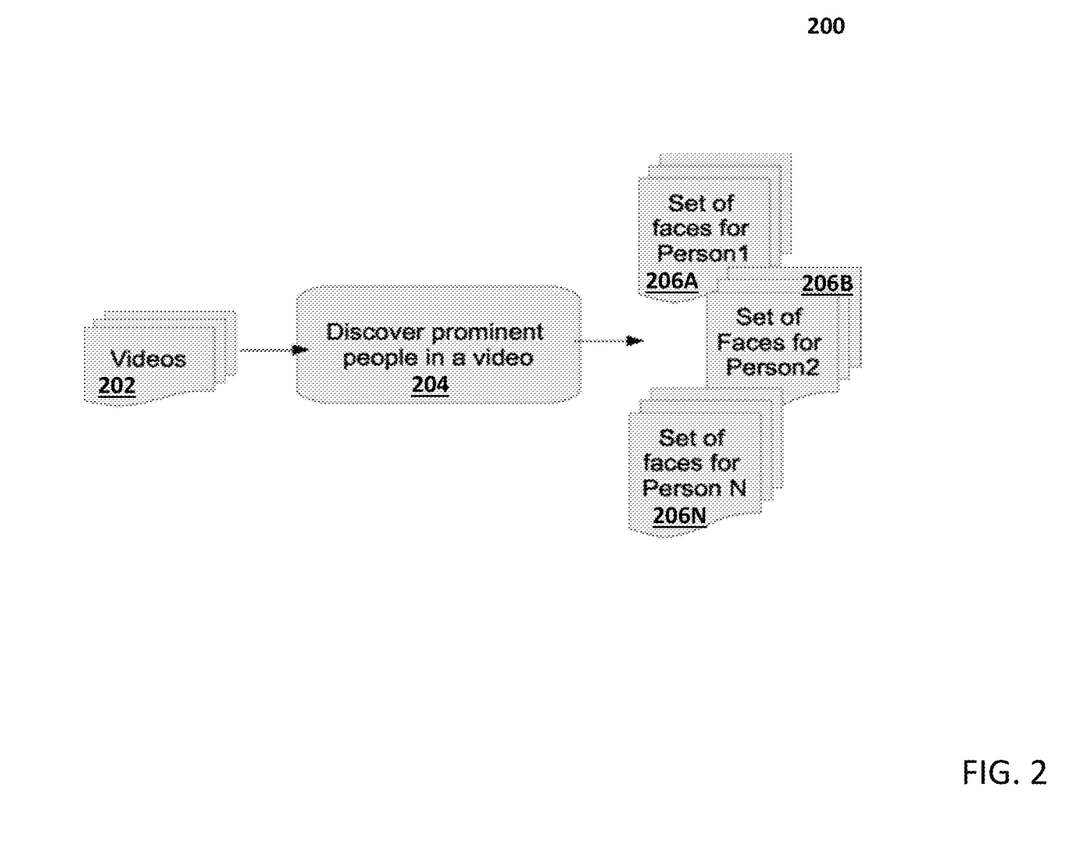
FIG. 2 is an exemplary diagram for finding predominant faces in videos, in accordance with some embodiments.

FIG. 2 shows an exemplary diagram 200 for finding predominant faces in videos, in accordance with some embodiments.

The system analyzes a video 202 and finds the most prominent faces in the video in block 204. The system can perform this task by first detecting faces across all frames and then clustering those faces into a predetermined number of groups. In accordance with some embodiments, at this point the system does not have information about the identity of the faces, so the information obtained is that the system identified faces in the given video.

The system can perform clustering and the result of this process is a set of face clusters. Each cluster is a set of faces that are assumed to belong to the same person. This is shown as the set of faces for person one 206A, the set of faces for person two 206B, and the set of faces for person N 206N, where N is the number of people identified in the video.

Figure 3:
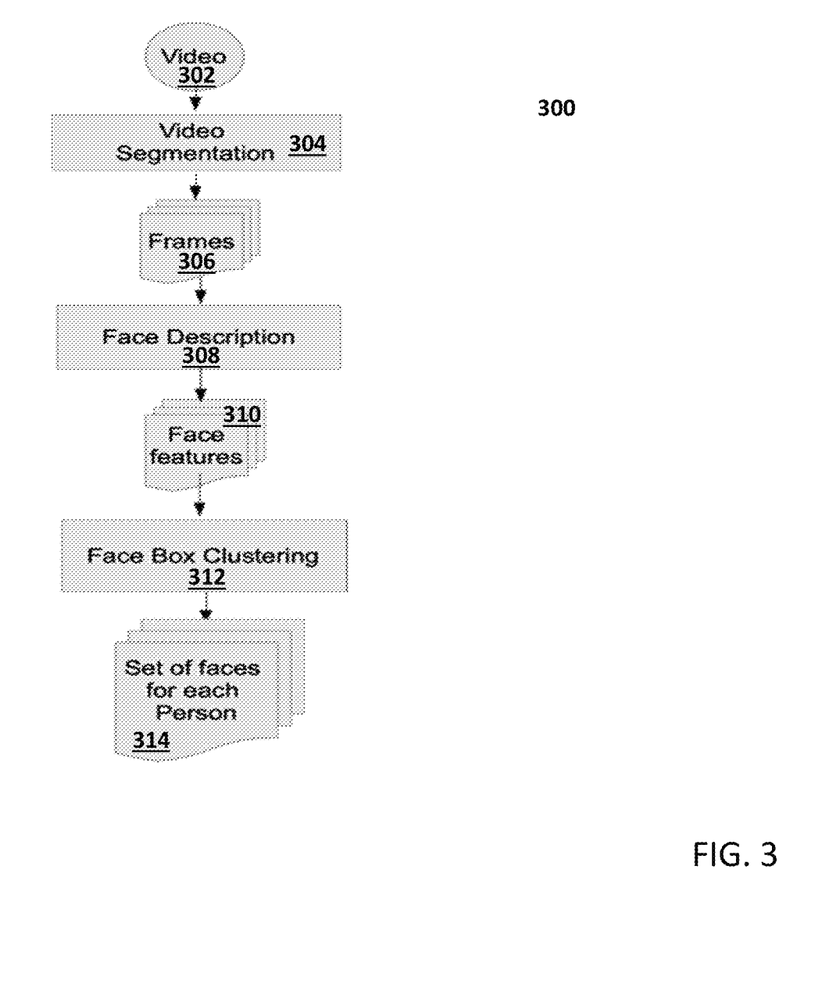
FIG. 3 is an exemplary diagram of a framework for finding the most prominent faces in a video, in accordance with some embodiments.

FIG. 3 shows an exemplary diagram of a framework 300 for finding the most prominent faces in a video, in accordance with some embodiments.

The framework 300 includes the following main parts: video segmentation 304, face description 308, and face box clustering 312.

Video Segmentation

The video segmentation component 304 divides a video 302 into several frames 306 in order to detect faces across the video 302. The system considers frames that have a high likelihood of having a face. Several methods can be used to segment a video, such as random sampling, uniform sampling, etc.

Video Segmentation Method

In accordance with some embodiments, the system uniformly samples a video with a sampling rate of 1 image every n/15 sec, where n is the length of the video in seconds, and performs face detection on all sampled images. For each image, if a face was detected, the system samples again around its neighbor frames (with rate 1 image every n/10 sec) and performs face detection on the newly sampled images. If no faces are detected the system stops sampling any further.

This procedure can be repeated multiple times, each time with a higher sampling rate in a smaller neighborhood. This procedure thus increases the likelihood of finding the majority of the frames containing faces.

Figure 4:
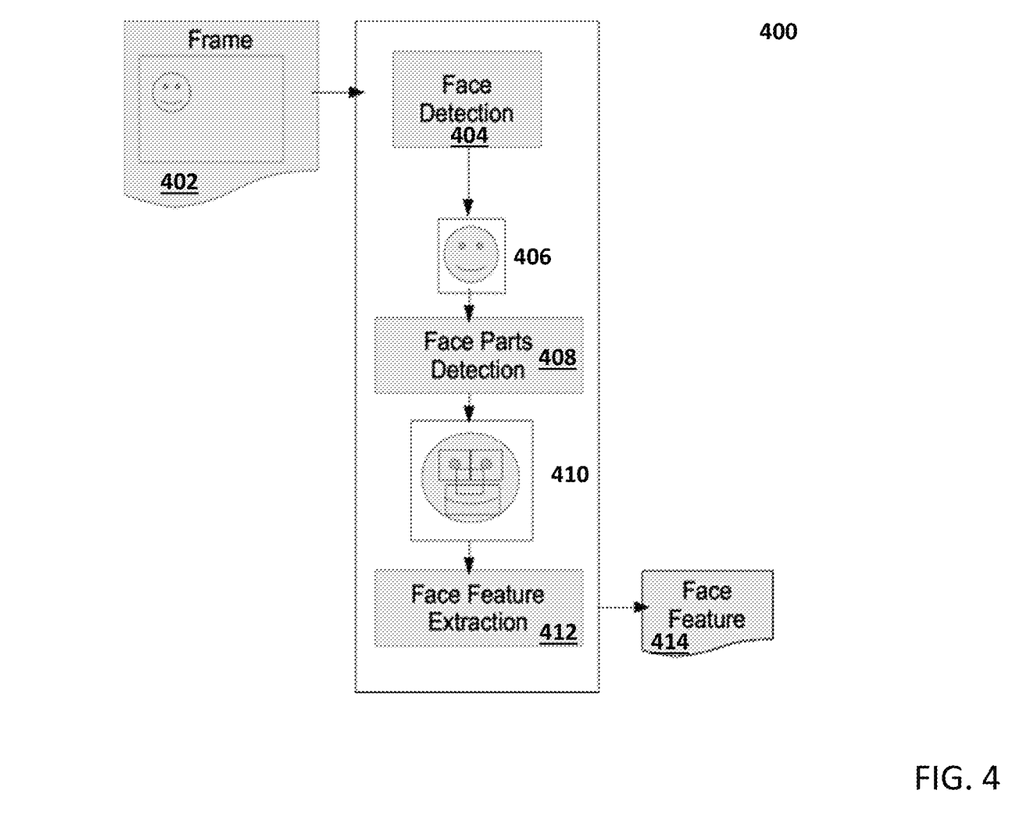
FIG. 4 is an exemplary diagram of extracting feature vectors for faces from frames, in accordance with some embodiments.

FIG. 4 shows an exemplary diagram 400 of extracting feature vectors for faces from a frame, in accordance with some embodiments. The extraction process consists of three main steps, including face detection 404, face parts detection 408 and face feature extraction 412.

Face Detection

Referring to FIG. 3, the face description component 308 generates face features 310 from the frames 306. Referring further to FIG. 4, given a set of frames provided by the segmentation algorithm, the system performs face detection 404 on each frame 402, which returns information about the locations of face boxes in the image 406. A face box is, for example, a list that contains information about the box surrounding the detected face. It stores the x and y coordinates of the lower rightmost corner of the box, and the height and width of the box. Information about the image (e.g., frame 402) and video where that face was found can also be included. The system can use, for example, the face detection method explained in Paul Viola and Michael Jones, "Rapid object detection using a boosted cascade of simple features," Computer Vision and Pattern Recognition (2001), which is hereby incorporated by reference herein in its entirety. The system can extend this method to perform face detection on semi frontal faces.

Face Part Detection

Given the approximate location of the face in the image, the system can be configured to perform face parts detection 408 to find a certain number of locations on the face 410. In some embodiments, the system can be configured to find 9 specific locations on the face: the left and right corners of each eye, the two nostrils, the tip of the nose, and the left and right corners of the mouth. Additional features, such as those corresponding to centers of eyes, and a point between the eyes and center of mouth, can be defined using interpolation from the (9) located parts. In some embodiments, the implementation is based on the algorithm described in Mark Everingham, Josef Sivic and Andrew Zisserman, "Hello! My name is . . . Buffy"—Automatic Naming of Characters in TV Video," Proceedings of the 17th British Machine Vision Conference (2006), which is hereby incorporated by reference herein in its entirety. More information about how these locations are important for face recognition and detection can be found in, for example, Pedro F. Felzenszwalb, Daniel P. Huttenlocher, "Pictorial Structures for Object Recognition," International Journal of Computer Vision (January 2005), which is hereby incorporated by reference herein in its entirety.

Face Feature Extraction and Representation

Each face is represented by a high dimensional feature vector 414 generated during face feature extraction 412. The face feature vector 414 captures information to uniquely represent the appearance of a face. The system can, for example, implement a simple pixel wise feature descriptor as shown in Mark Everingham, Josef Sivic and Andrew Zisserman, "Hello! My name is . . . Buffy"—Automatic Naming of Characters in TV Video," Proceedings of the 17th British Machine Vision Conference (2006).

Clustering

After obtaining all face descriptors, the system performs face box clustering 312 to find which faces belong to the same person by grouping them appropriately. The output is a set of faces for each person 314. Several clustering algorithms such as kmeans, hierarchical kmeans, spectral clustering, etc., can be used to generate these sets. As another example, the system can use the clustering algorithm described further below.

For example, given features f1, f2, . . . fn, the algorithm clusters the features into groups, g1, g2, . . . gk, where k represents the number of unique people found in that video. Each group can include an intra group distance metric which indicates the compactness of the group.

The clustering algorithm begins by generating an n×n distance matrix D, where n represents the number of faces features given for clustering. D(i, j) represents the distance between faces i and j. The computerized algorithm can use distance metrics like euclidean, cosine, etc.

Some function definitions are provided below for exemplary purposes:

Grp(f) returns the group where feature f belongs to. If the face is unassigned it will be NULL. At any time, a face can belong to only one group. All faces will start with a NULL group.

DistGrp(f, g) represents the distance between the face f and the group g. This distance can be the either avg, min, max distance of the feature f and all features in the group g.

BestGrp(f, g1, g2) compares DistGrp(f, g1) and DistGrp (f, g2) and returns the group where f belongs to.

Exemplary Clustering Method

The system can recursively repeat the following steps 1 to 7 until all faces are processed.

1. Randomly pick an unprocessed face from the given set of faces
2. For fi, get all neighbors n1, n2 . . . nk, such that the DistGrp(fi,nk)<thresh.
3. For the set (fi, n1, n2 . . . nk), get the most frequent group_id, g_max
4. If the number of faces having the same group_id, i.e g_max>min_majority,
   a. for each faces fi in the set,
      i. If Grp(f) was NULL, assign it to g_max
      ii. if Grp(f) !=g_max, pick the group given by BestGrp(f, g_max, old_group)
5. If a single majority is not established or if all faces have NULL groups, create a new group for all faces Grp(f) ==NULL.

For all the remaining faces, choose BestGrp(f, g_old, g_new)

6. Recompute the intra group distance for modified groups.
7. Mark fi as processed Parameters that can be Optimized The system can optimize parameters when performing these calculations. For example, two parameters that can be optimized are thresh and min_majority. A larger thresh can have the problem of grouping multiple persons into the same group, while a smaller thresh may cause two groups within the same person. Regarding min_majority, the parameter can be optimized to specify the minimum percentage of people in the neighbors that should belong to the same group for not creating a new group.

As a result of running this algorithm, the results can provide groups of features which potentially are faces of the same person. The system can also observe certain singletons, who do not fit into any group.

Face Recognition

Figure 5:
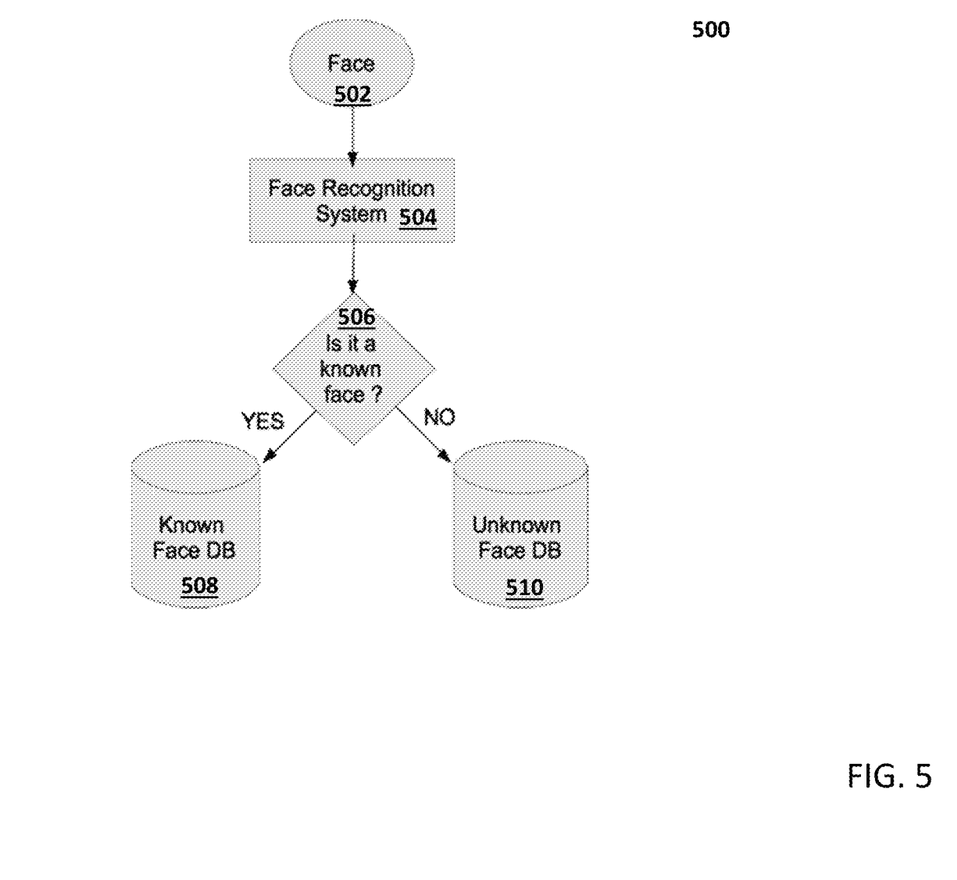
FIG. 5 is an exemplary face recognition framework, in accordance with some embodiments.

FIG. 5 shows an exemplary face recognition framework, in accordance with some embodiments. Given a face 502, the face recognition system 504 decides at step 506 if the face 502 belongs to the database of known people 508 or the database of unknown faces 510.

For every identified face 502, the system decides if it belongs to a known person (included in the known face database 508). Otherwise is included in the database of unknown people 510. This decision is made by analyzing the feature descriptor obtained from the face feature extraction process, as explained above.

Given that face recognition may not be 100% accurate, the system can optionally include a verification step after the recognition process. The system can use crowdsourcing to verify the decision made by the face recognition model. If the system made a correct recognition, the system can include the face in the known face DB.

Automatically Acquiring Training Data

A challenge with building a face recognition system is often to learn models that are robust to variations in pose, illumination and/or image quality. In order to build a robust face model, the system can use training data that includes information representative of these variations. The system can use an automatic method to acquire training data for face recognition, that can include face examples that account for all these variations, which is further described below.

Figure 6:
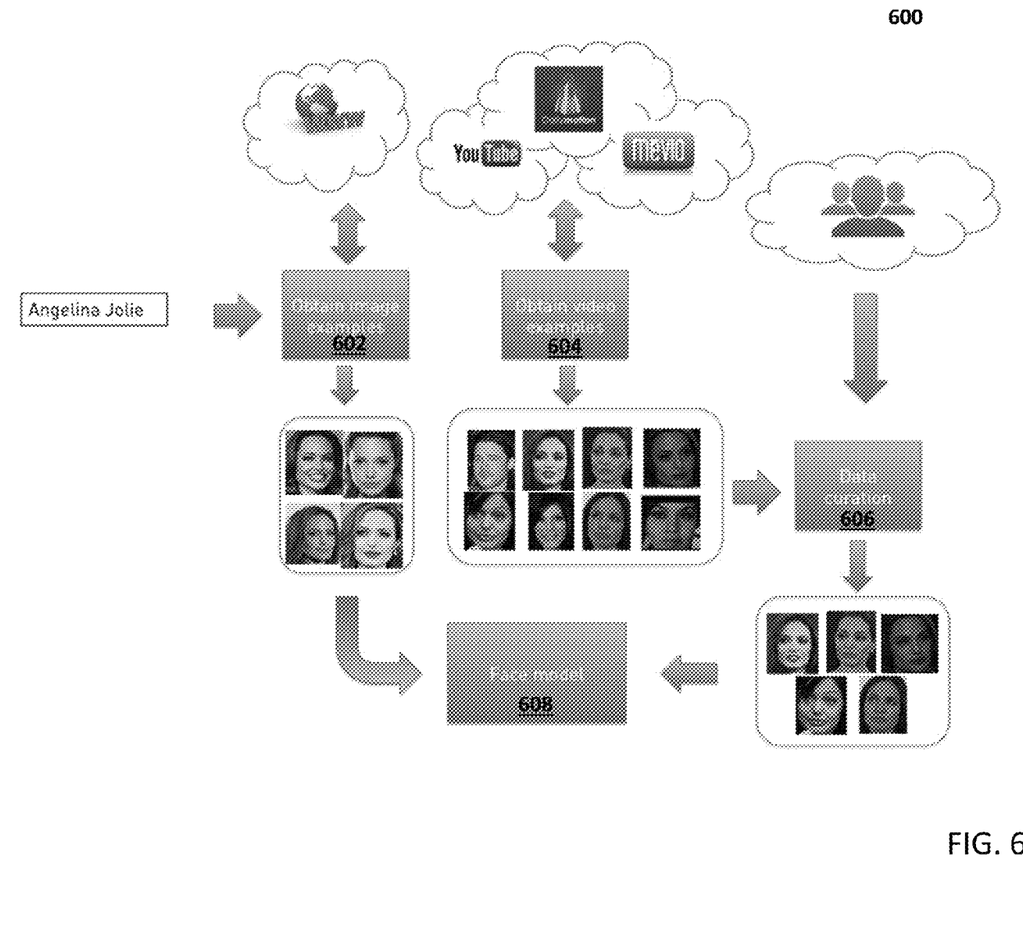
FIG. 6 is an exemplary diagram of automatic collection of training data using the web and crowdsourcing techniques, in accordance with some embodiments.

FIG. 6 is an exemplary diagram 600 of automatic collection of training data using the web and crowdsourcing techniques, in accordance with some embodiments.

To obtain training data that covers all kinds of variations, the system selects examples from both images (at block 602) as well as videos available on the web (at block 604).

The system extracts frames on all the videos collected and detects faces using, for example, methods explained herein. Besides videos, the system can also query the web to collect images and detect faces that appear on them. Then, the system combines the faces detected on video data with faces obtained from images to build a large set of faces representative of the celebrity. All these faces are then curated using crowdsourcing techniques at data curation block 606. From the curated set, the correct faces are used for training a new face model 608 for face recognition.

Training of a Face Model

To train a face model the system can, in some embodiments, use the dual subspace method as mentioned in Xiaogang Wang and Xiaoou Tang, "Unified Subspace Analysis for Face Recognition," Proceedings of the Ninth IEEE International Conference Computer Vision (2003), which is hereby incorporated by reference herein in its entirety. This method often has superior performance compared to other standard subspace projection techniques.

Linear discriminant analysis (LDA) can be an important step in the unified (or dual) subspace technique. However, LDA may fail to find the nonlinear structure hidden in the high dimensional data, and/or assume equal contribution from all samples to perform dimensionality reduction. Another technique called DLA (Discriminative Locality Alignment) can be used to adjust for such potential issues when training a face model, such as described in Tianhao Zhang et al., "Discriminative Locality Alignment," Proceedings of the 10th European Conference on Computer Vision: Part I, Oct. 12-18, 2008, Marseille, France, which is hereby incorporated by reference herein in its entirety.

In the unified subspace technique, a person can be represented by a single feature vector that is the average of all feature vectors of that person in the subspace. However, in online videos featuring celebrities, facial appearances can change drastically across videos due to various factors like aging, facial make up, etc. As a result, all faces might not fit into a tight cluster and loose clusters might lead to a sub optimal face model. Instead of representing each person by a single cluster center, another approach to training a face model, would be to consider each feature vector individually and perform nearest neighbor search on all feature vectors in the subspace.

High dimensional nearest neighbor search can be computationally expensive. Performance gains can be obtained by using approximate search schemes, such as Locality-Sensitive Hashing (LSH) described in Mayur Datar et al., "Locality-sensitive hashing scheme based on p-stable distributions," Proceedings of the twentieth annual symposium on Computational geometry, Jun. 8-11, 2004, Brooklyn, N.Y., USA, which is hereby incorporated by reference herein in its entirety. Different variants of LSH can be used. For example, k-means LSH achieves very high recall in spite of using only a limited number of hash functions, such as described in Loïc Paulevéa et al., "Locality sensitive hashing: A comparison of hash function types and querying mechanisms," Pattern Recognition Letters Volume 31, Issue 11, 1 Aug. 2010, Pages 1348-1358, which is hereby incorporated by reference herein in its entirety.

Some embodiments of training a face model can involve using approximate nearest neighbor algorithm. Such a system can include the following steps, for example: project face features to a lower dimensional space using the DLA technique mentioned earlier; build a hash from all projected feature vectors using the Kmeans LSH technique and perform approximate nearest neighbors search to recognize unknown faces, and/or the like.

Face Discovery

Figure 7A:
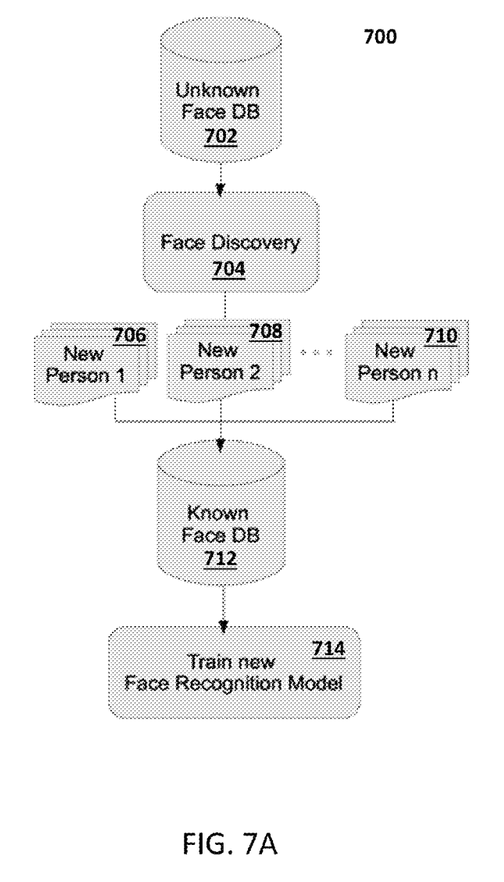
FIG. 7A is an exemplary face discovery system, in accordance with some embodiments.

FIG. 7A is an exemplary face discovery system 700, in accordance with some embodiments. The system 700 executes the face discovery component 704 to discover faces corresponding to particular person given all the data stored in the unknown face DB 702. Once the system determines their identity, the system can include each person (new person 1 706, new person 2, 708, new person n 710) into the known face database 712 and train a new face recognition model at block 714 based on the updated information in the known face database.

Figure 7B:
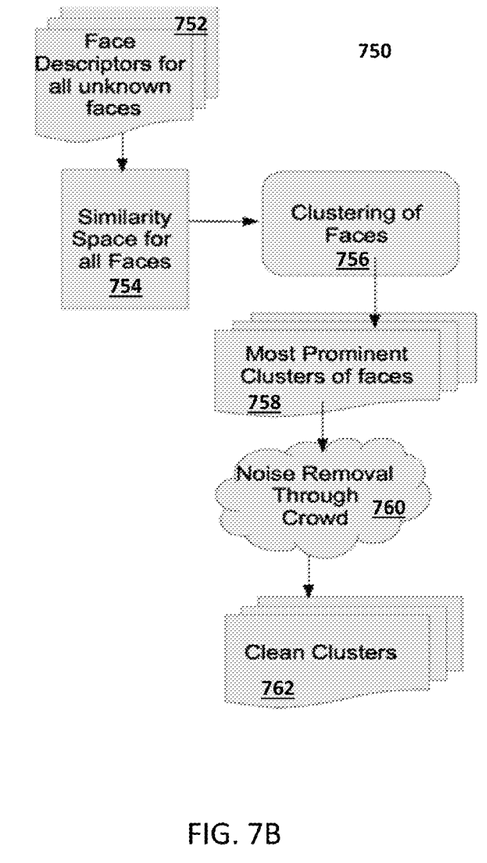
FIG. 7B is an exemplary face discovery system in detail, in accordance with some embodiments.

FIG. 7B is an exemplary face discovery system 750 in detail, in accordance with some embodiments. The face discovery system can be designed to find faces of people that appear in a high number of videos across the database. Every time the system processes a video, the system detects faces on its frames and store the faces in the unknown people database. When the number of faces in the unknown face DB exceeds a particular threshold, the system can run the face discovery system.

The system can start by computing face descriptors 752, as described below, for each face and then compute their similarity with respect the other faces in the database at block 754 (many metrics can be used to compute an embedding that can represent the space where these faces live). Then, the system can perform clustering in that particular space and group faces in a determined number of clusters at block 756. As described above, the system can find the most prominent cluster of faces 758, which the system can be configured to assume to correspond to a particular person. The system can use crowdsourcing 760 to remove faces that don't belong to the person (identified the majority of faces in the cluster). Finally the system can include the clean clusters 762 for the new person into the known people database.

Similarity Space of Faces

Each face is described by a high dimensional vector (descriptor). A good descriptor is such that it shows similar properties for faces of the same person and discriminative properties for faces of different people. The quality of the descriptor can be evaluated based on its discriminative power between faces of different people. Using a good descriptor for representing a face enables the system to accurately establish a similarity metric between faces. The role of the similarity space is to accurately map a space where these faces are represented. The similarity space is constructed by choosing a distance function (e.g., a Mahalanobis distance function) to compute between each feature. This distance/similarity is used later as input for the clustering algorithm.

Clustering (Grouping)

After establishing the similarity space, the system can use clustering techniques to identify a possible set of faces that belong to the same person. The output of the clustering algorithm is a sets of faces such that each set contains faces of the same person. The algorithm can output several set of faces, each corresponding to a different person. The system can use, for example, hierarchical clustering as described in the Wikipedia Hierarchical Clustering article (available at http://en.wikipedia.org/wiki/Hierarchical_clustering), which is hereby incorporated by reference herein in its entirety, to perform this grouping, since the amount of data is big and the variability across faces high.

Noise Removal Via Crowdsourcing

The output of the clustering algorithm is a set of faces that potentially belong to the same person. However this task is prone to errors due to the vast variation in data. Therefore the system can use crowdsourcing to verify that the clusters only contain faces of a particular person. Using crowdsourcing, the system can also identify the name of the person whose faces belong to that particular cluster.

Video Labeling

Figure 8:
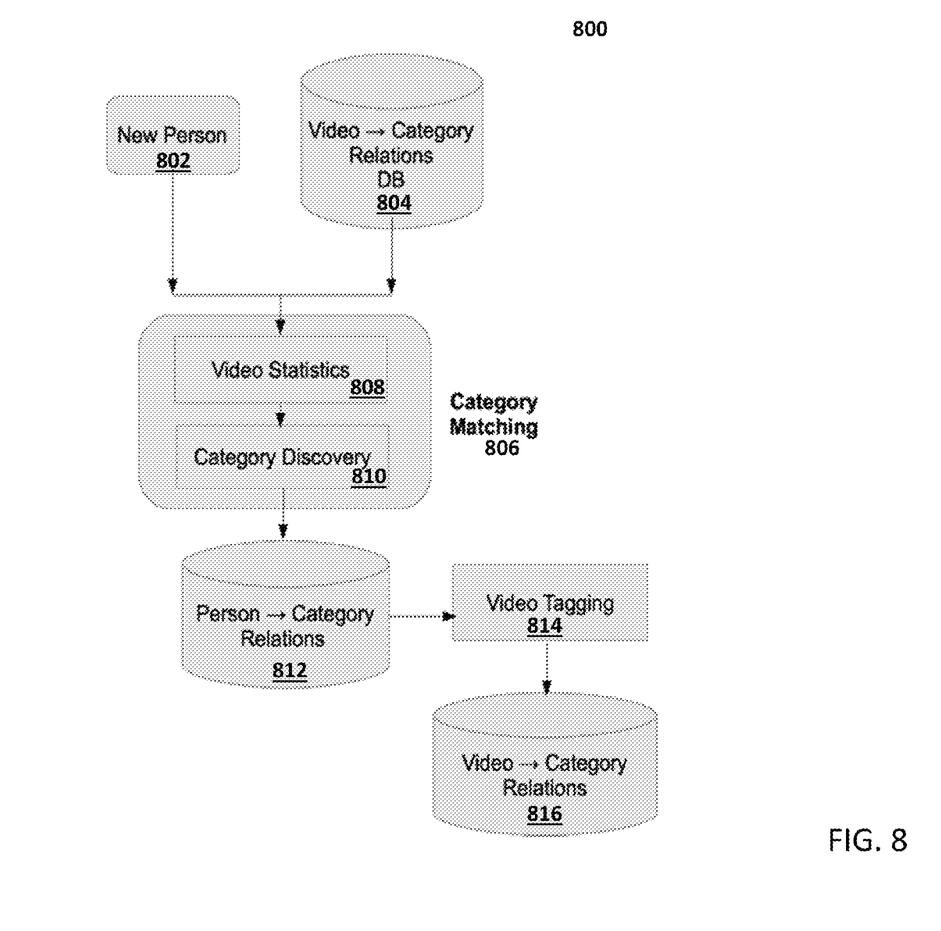
FIG. 8 is an exemplary diagram of identifying videos for a newly identified person, in accordance with some embodiments.

FIG. 8 is an exemplary diagram 800 of identifying videos for a newly identified person, in accordance with some embodiments. Given a new person 802 (e.g., discovered as described above) the system can find in which videos and categories from the database 804 the new person 802 usually appears in system inventory using category matching 806. For example, the system can search for videos in which the newly identified person appears and which already have one or more categories associated with each video. Then, the resulting person to category relations 812 are used to label videos with those categories during video tagging 814, resulting in video to category relations 816.

The system can be configured to understand, given the content of a video and a list of predefined categories 804, which categories the video belongs to. Therefore the last part of the system configuration establishes video to category relations (Video→Category) for videos in system inventory. The system can perform this task by aggregating information from various sources such as scenes detected, audio transcription, text on the web page that contains the video, etc. By identifying people in videos the system can infer more information about the content of the video and therefore, establish more accurate Video→Category relations. U.S. patent application Ser. No. 13/793,384, entitled "Systems and Methods for Defining Video Advertising Channels" and filed on Mar. 11, 2013, describes techniques for partially subjective classification of online videos for advertising channels, including scene detection, which is hereby incorporated by reference herein in its entirety.

When the face discovery system discovers a new person, a different part of the system called "category matching" is triggered in order to establish "Person→Category" relations. These relations represent a connection between a particular person and a set of categories. These categories are found by considering all the videos where that particular person was found and take the category (or tag) that occurs the most across those videos. Examples of these relations are "LeBron James→Basketball", "LeBron James→Miami Heat" and "Tom Cruise→Movies".

The "Person→Category" relations are discovered by understanding the existing "Video→Category" relations for all the videos in which that person was identified.

Video Statistics

After the new person is identified, the video statistics 808 process is responsible for finding all the videos where the system previously found this person and gather all the categories those videos belong to.

Category Discovery

The category discovery process 810 is configured to summarize all the information from the previous step and create category relations for that person. The simplest way of doing this is by choosing the most common categories or by using machine learning algorithms to establish these relations.

Video Tagging

Once the person's relations to various categories are established, the system may perform video tagging 814 to update all the videos in which that person's face was recognized. The result is to achieve a set of video to category relations, such as video one (which includes LeBron James) is related to basketball. The person (e.g., and associated categorie(s)) can be added to the known people database. Once added, the next time the techniques are executed for a new video, the person can be included in the known person search for a match.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method for automatically classifying videos based on faces discovered in the videos, wherein the discovered faces are not known to be associated with a particular category of videos, the method comprising:
   receiving, by a programmable processor, a video for classification;
   detecting, by the programmable processor, a face of a person in the video;
   determining, by the programmable processor, that the detected face is not associated with a set of known people stored in a database of known persons that is in communication with the computing device, wherein each known person from the set of known people is associated with one or more categories that can be used to classify videos in which the known person appears;
   comparing, by the programmable processor, the detected face to a set of unknown faces in an database of unknown faces in communication with the programmable processor, to generate a cluster of unknown faces that each match with the detected face by meeting a predetermined match threshold;
   identifying, by the programmable processor, a set of categorized videos based on the cluster of unknown faces; and
   assigning, by the programmable processor, one or more categories to the video based on categories associated with the set of categorized videos so that the video can be automatically classified based on the detected face even though the detected face is not associated with a known person.

2. The method of claim 1, further comprising adding the detected face and the one or more categories to the database of known persons so that the detected face can be used to classify new videos.

3. The method of claim 1, further comprising:
   identifying a set of videos in which each unknown face from the cluster of unknown faces appears; and
   assigning the one or more categories to each video in the set of videos.

4. The method of claim 1, wherein assigning the one or more categories to the video comprises:
  selecting a category used most among the set of categorized videos; and
  assigning the selected category to the video.

5. The method of claim 1, wherein detecting the face of the person comprises:
  generating, for a set of frames from the video, a feature vector to uniquely represent the appearance of each of one or more faces identified in the frame; and
  clustering the feature vectors to identify one or more groups of feature vectors, wherein one of the one or more groups of feature vectors is associated with the face of the person.

6. A server for automatically classifying videos based on faces discovered in the videos, wherein the discovered faces are not known to be associated with a particular category of videos, the server comprising:
  a database of known persons;
  a database of unknown faces; and
  a programmable processor in communication with the database of known persons and the database of unknown faces, and configured to run a module stored in memory, comprising instructions that when executed cause the programmable processor to:
  receive a video for classification;
  detect a face of a person in the video;
  determine that the detected face is not associated with a set of known people stored in the database of known persons, wherein each known person from the set of known people is associated with one or more categories that can be used to classify videos in which the known person appears;
  compare the detected face to a set of unknown faces in the database of unknown faces, to generate a cluster of unknown faces that each match with the detected face by meeting a predetermined match threshold;
  identify a set of categorized videos based on the cluster of unknown faces; and
  assign one or more categories to the video based on categories associated with the set of categorized videos so that the video can be automatically classified based on the detected face even though the detected face is not associated with a known person.

7. The server of claim 6, wherein the module stored in memory further comprises instructions that when executed cause the programmable processor to add the detected face and the one or more categories to the database of known persons so that the detected face can be used to classify new videos.

8. The server of claim 6, wherein the module stored in memory further comprises instructions that when executed cause the programmable processor to:
  identify a set of videos in which each unknown face from the cluster of unknown faces appears; and
  assign the one or more categories to each video in the set of videos.

9. The server of claim 6, wherein the instructions that when executed cause the programmable processor to assign the one or more categories to the video comprise instructions that when executed cause the programmable processor to:
  select a category used most among the set of categorized videos; and
  assign the selected category to the video.

10. The server of claim 6, wherein the instructions that when executed cause the programmable processor to detect the face of the person comprise instructions that when executed cause the programmable processor to:
  generate, for a set of frames from the video, a feature vector to uniquely represent the appearance of each of one or more faces identified in the frame; and
  cluster the feature vectors to identify one or more groups of feature vectors, wherein one of the one or more groups of feature vectors is associated with the face of the person.

11. A non-transitory computer readable medium having executable instructions stored thereon, comprising instructions that when executed cause a programmable processor to:
  receive a video for classification;
  detect a face of a person in the video;
  determine that the detected face is not associated with a set of known people stored in a database of known persons that is in communication with the programmable processor, wherein each known person from the set of known people is associated with one or more categories that can be used to classify videos in which the known person appears;
  compare the detected face to a set of unknown faces in a database of unknown faces in communication with the programmable processor, to generate a cluster of unknown faces that each match with the detected face by meeting a predetermined match threshold;
  identify a set of categorized videos based on the cluster of unknown faces; and
  assign one or more categories to the video based on categories associated with the set of categorized videos so that the video can be automatically classified based on the detected face even though the detected face is not associated with a known person.

12. The non-transitory computer readable medium of claim 11, wherein the instructions further comprise instructions that when executed cause the programmable processor to add the detected face and the one or more categories to the database of known persons so that the detected face can be used to classify new videos.

13. The non-transitory computer readable medium of claim 11, wherein the instructions further comprise instructions that when executed cause the programmable processor to:
  identify a set of videos in which each unknown face from the cluster of unknown faces appears; and
  assign the one or more categories to each video in the set of videos.

14. The non-transitory computer readable medium of claim 11, wherein the instructions that when executed cause the programmable processor to assign the one or more categories to the video comprise instructions that when executed cause the programmable processor to:
  select a category used most among the set of categorized videos; and
  assign the selected category to the video.

15. The non-transitory computer readable medium of claim 11, wherein the instructions that when executed cause the programmable processor to detect the face of the person comprise instructions that when executed cause the programmable processor to:
  generate, for a set of frames from the video, a feature vector to uniquely represent the appearance of each of one or more faces identified in the frame; and cluster the feature vectors to identify one or more groups of feature vectors, wherein one of the one or more groups of feature vectors is associated with the face of the person.

* * * * *